United States Patent
Shen et al.

(10) Patent No.: US 12,197,951 B1
(45) Date of Patent: Jan. 14, 2025

(54) MOBILE EDGE COMPUTING (MEC) TASK UNLOADING METHOD WITH CACHE MECHANISM

(71) Applicant: Chengdu University of Information Technology, Chengdu (CN)

(72) Inventors: Yan Shen, Chengdu (CN); Jiao Chen, Chengdu (CN)

(73) Assignee: Chengdu University of Information Technology, Chengdu (CN)

(*) Notice: Subject to any disclaimer, the term of this patent is extended or adjusted under 35 U.S.C. 154(b) by 0 days.

(21) Appl. No.: 18/748,154

(22) Filed: Jun. 20, 2024

(30) Foreign Application Priority Data

Nov. 15, 2023 (CN) .......................... 202311518680.1

(51) Int. Cl.
 *G06F 9/50* (2006.01)
 *G06F 17/11* (2006.01)

(52) U.S. Cl.
 CPC ............ *G06F 9/5016* (2013.01); *G06F 17/11* (2013.01); *G06F 2209/506* (2013.01); *G06F 2209/509* (2013.01)

(58) Field of Classification Search
 CPC .................. G06F 9/5016; G06F 17/11; G06F 2209/506; G06F 2209/509
 See application file for complete search history.

(56) References Cited

U.S. PATENT DOCUMENTS

| | | | |
|---|---|---|---|
| 11,930,080 B1* | 3/2024 | Jiang | H04L 67/12 |
| 2022/0400062 A1* | 12/2022 | Cai | H04L 41/50 |
| 2024/0192995 A1* | 6/2024 | Chen | G06F 9/5027 |

FOREIGN PATENT DOCUMENTS

| | | |
|---|---|---|
| CN | 111132191 A | 5/2020 |
| CN | 111818130 A | 10/2020 |
| CN | 113434212 A | 9/2021 |

(Continued)

OTHER PUBLICATIONS

Zhao Chan Chan, et al., Joint Optimization Strategy of Task Offloading and Resource Allocation for Cache-assisted Mobile Edge Computing, Science Technology and Engineering, 2023, pp. 3812-3819, vol. 23 No. 9.

(Continued)

*Primary Examiner* — Zachary K Huson
(74) *Attorney, Agent, or Firm* — Bayramoglu Law Offices LLC

(57) ABSTRACT

A mobile edge computing (MEC) task unloading method with a cache mechanism includes: S1: establishing a task unloading total delay model with a cache mechanism and a mobile device-side total energy consumption model based on a user task request; S2: based on the task unloading total delay model and the mobile device-side total energy consumption model, with a goal of minimizing a task unloading total delay and a mobile device-side total energy consumption, establishing a joint optimization model configured for task unloading and caching and having a constraint; S3: transforming the joint optimization model into a fitness function for a particle, where the user task request is the particle; and S4: determining an optimal solution of the particle by using a particle swarm algorithm based on the fitness function, where the optimal solution of the particle is an optimal task unloading decision of the user task request.

6 Claims, 1 Drawing Sheet

(56) References Cited

FOREIGN PATENT DOCUMENTS

| CN | 114863683 A | 8/2022 |
| CN | 116260871 A | 6/2023 |
| CN | 116361009 A | 6/2023 |
| CN | 116566838 A | 8/2023 |
| CN | 116963182 A | 10/2023 |
| EP | 3648436 A1 | 5/2020 |
| WO | 2021012584 A1 | 1/2021 |

OTHER PUBLICATIONS

Sang Yongxuan, et al., Hybrid Heuristic Task Offloading Algorithm with Edge Caching Mechanism, Computer Engineering, 2023, pp. 149-158, vol. 49 No. 4.

Shuai Yu, et al., Computation Offloading with Data Caching Enhancement for Mobile Edge Computing, IEEE Transactions on Vehicular Technology, 2018, pp. 1-15.

Wenqi Zhou, et al., Offloading strategy with PSO for mobile edge computing based on cache mechanism, Cluster Computing, 2022, pp. 2389-2401, vol. 25.

\* cited by examiner

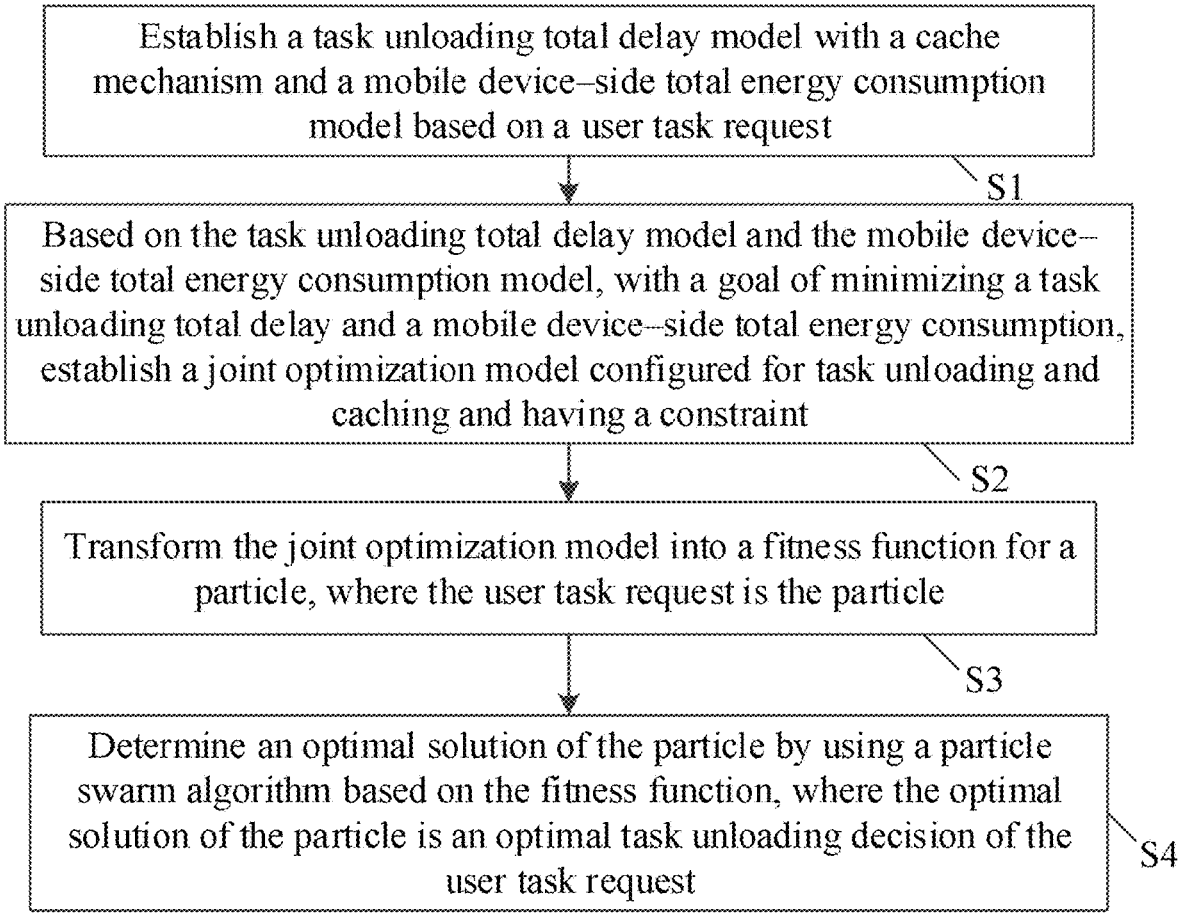

MOBILE EDGE COMPUTING (MEC) TASK UNLOADING METHOD WITH CACHE MECHANISM

CROSS REFERENCE TO THE RELATED APPLICATIONS

This application is based upon and claims priority to Chinese Patent Application No. 202311518680.1, filed on Nov. 15, 2023, the entire contents of which are incorporated herein by reference.

TECHNICAL FIELD

The present disclosure relates to the technical field of edge computing, and in particular, to a mobile edge computing (MEC) task unloading method with a cache mechanism.

BACKGROUND

With popularization of mobile devices and rapid development of applications, an increasing number of applications need to perform computing and storage. A traditional cloud computing model has problems of high computational delay, network bandwidth bottleneck, and high energy consumption. In order to resolve these problems, mobile edge computing (MEC) comes into being. The MEC can place computing and storage resources in an edge network closer to users, respond to requests from the users faster, reduce network bandwidth pressure, and reduce an energy consumption. However, the MEC also has problems of limited resources, diversified tasks, and a huge quantity of users.

Most literatures mainly consider a delay and an energy consumption for an MEC task unloading strategy. Some literatures consider a cache mechanism, mainly by combining the delay.

SUMMARY

An objective of the present disclosure is to provide an MEC task unloading method with a cache mechanism to reduce a delay and an energy consumption of task unloading and processing, thereby further improving efficiency and accuracy of unloading an edge computing task.

In order to resolve the above technical problem, the present disclosure adopts following technical solutions:

The present disclosure provides an MEC task unloading method with a cache mechanism, where the MEC task unloading method with a cache mechanism includes:

S1: establishing a task unloading total delay model with a cache mechanism and a mobile device-side total energy consumption model based on a user task request;

S2: based on the task unloading total delay model and the mobile device-side total energy consumption model, with a goal of minimizing a task unloading total delay and a mobile device-side total energy consumption, establishing a joint optimization model configured for task unloading and caching and having a constraint;

S3: transforming the joint optimization model into a fitness function for a particle, where the user task request is the particle; and S4: determining an optimal solution of the particle by using a particle swarm algorithm based on the fitness function, where the optimal solution of the particle is an optimal task unloading decision of the user task request.

Optionally, in the S1, the cache mechanism includes:

determining popularity, freshness, and a size factor of a task based on the user task request;

where the popularity $pop_k$ is $$pop_k = \frac{r_k}{t_k \cdot s_k} = \frac{Num_k^3}{\sum_{a=1}^{Num_k}(t_{k,a}^{com} - t_{k,a}^{res}) \cdot (t_k^{last} - t_k^{first}) \cdot \sum_{k=1}^{K} Num_k}$$

the freshness $fre_k$ is:

$$fre_k = \frac{1}{(t_k^{now} - t_k^{gen})}(t_k^{now} > t_k^{gen})$$

the size factor $weight_k$ is:

$$weight_k = 1 - \frac{\log_{10}(I_k)}{\log_{10}(size_{max})}$$

where $r_k$ represents a request probability of a task $d_k$, $t_k$ represents access time of the task $d_k$, $s_k$ represents an average request time interval of the task $d_k$, $Num_k$ represents a quantity of requests for the task $d_k$, $t_{k,a}^{com}$ represents completion time of an $\alpha^{th}$ request for the task $d_k$, $t_{k,a}^{res}$ represents request time of the $\alpha^{th}$ request for the task $d_k$, $t_k^{last}$ represents time of a last request for the task $d_k$, $t_k^{first}$ represents time of a first request for the task $d_k$, K represents presence of K tasks, $d_k$ represents a $k^{th}$ task, $\alpha$ represents the $\alpha^{th}$ request, $t_k^{now}$ represents current time, $t_k^{gen}$ represents generation time of the task $d_k$, $I_k$ represents an input data size of the task $d_k$, $size_{max}$ represents a maximum task data size in a user task request set, and $\log_{10}(\ )$ represents a computation function of the size factor;

obtaining a function value of the task based on the popularity, the freshness, and the size factor of the task;

where $pri_k = \alpha \times pop_k + \beta \times fre_k + \gamma \times weight_k$ where $\alpha$, $\beta$, and $\gamma$ represent different weight parameters, $pop_k$ represent popularity of the task $d_k$, $fre_k$ represents freshness of the task $d_k$, $weight_k$ represents a size factor of the task $d_k$, and $d_k$ represents the $k^{th}$ task; and updating cache space based on the function value of the task.

Optionally, the updating cache space based on the function value of the task includes:

A1: dividing a request cycle into a plurality of time slots;

A2: obtaining a size of a processing result of a current task in a request set of a user task request in each time slot and a current available size of cache space of a server;

A3: determining whether the current available size of the cache space of the server is greater than the size of the processing result of the current task; and if so, performing A6; otherwise, performing A4;

A4: determining whether the current task has been cached; and if so, updating a function value of the current task, and performing A5; otherwise, adding the processing result of the current task to the cache space, and performing A5;

A5: comparing function values of all tasks in the cache space, marking a minimum value as $pri_{min}$, using a next task as a current task, and performing the A2;

A6: computing a function value of the current task, comparing function values of historical tasks in the cache space, and marking a minimum value as $pri_{min}$; and A7: if the function value of the current task is greater than the minimum value $pri_{min}$, removing a task corresponding to the minimum value from the cache space, updating the current available size of the cache space, and returning; otherwise, skipping updating the cache space, using a next task as a current task, and performing the A2.

Optionally, the task unloading total delay model is:

$$T_{n,k} = \frac{|x_k - 2||x_k - 1|}{2}T_{n,k}^{local} + x_k|x_k - 2|(1 - \text{Hit}_k) \cdot T_{n,k}^{off} + x_k\frac{|x_k - 1|}{2}\text{Hit}_k \cdot T_{n,k}^{coche}$$

the mobile device-side total energy consumption model is:

$$E_{n,k} = \frac{|x_k - 2||x_k - 1|}{2}E_{n,k}^{local} + x_k|x_k - 2|E_{n,k}^{off} + x_k\frac{|x_k - 1|}{2}E_{n,k}^{coche}$$

where $T_{n,k}$ represents a total delay of executing a $k^{th}$ task by an $n^{th}$ user; $T_{n,k}^{local}$ represents a local computing delay of executing the $k^{th}$ task by the $n^{th}$ user, and $$T_{n,k}^{local} = \frac{\omega_k}{f_{n,k}^{local}} = \frac{I_k \cdot f_k}{f_{n,k}^{local}};$$

$f_{n,k}^{local}$ represents computing power of a central processing unit (CPU) of a mobile device when the $n^{th}$ user executes the $k^{th}$ task, in other words, a quantity of CPU cycles executed per second; $\omega_k$ represents a quantity of computing resources required to complete the $k^{th}$ task, in other words, a total quantity of CPU cycles; $I_k$ represents a data size of the $k^{th}$ task, $f_k$ represents a quantity of cycles required for each data bit in the $k^{th}$ task, and $x_k$ represents a joint decision variable for unloading and caching the $k^{th}$ task; $\text{Hit}_k$ represents a cache hit rate of the $k^{th}$ task, and the cache hit rate is $$\text{Hit}_k = \frac{r_k\frac{O_k}{M}}{r_k\frac{O_k}{M} + (1 - r_k)\cdot\left(1 - r_k\frac{O_k}{M}\right)};$$

$r_k$ represents a request probability of the $k^{th}$ task; $O_k$ represents a size of a processing result of the $k^{th}$ task; M represents a size of a cache capacity of a server; $T_{n,k}^{off}$ represents a persistence delay of unloading the $k^{th}$ task to the server by the $n^{th}$ user, and $T_{n,k}^{off}=T_{n,k}^{trans}+T_{n,k}^{exe}+T_{n,k}^{result}$;

$$T_{n,k}^{trans} = \frac{I_k}{R_{n,mec}}$$

represents an uplink transmission delay of unloading the $k^{th}$ task with an input size of $I_k$ to the server by the $n^{th}$ user;

$R_{n, mec}$ represents an uplink data rate at which the $n^{th}$ user connects to the server through a wireless link, and $$R_{n,mec} = B\log_2\left(1 + \frac{P_nH_n}{\sigma^2}\right);$$

B represents a channel bandwidth; $P_n$ represents transmission power of the mobile device of the $n^{th}$ user; $H_n$ represents a gain of a channel between the $n^{th}$ user and the server; $\sigma^2$ represents additive Gaussian white noise power; $T_{n,k}^{exe}$ represents a processing delay of the server when the $n^{th}$ user executes the $k^{th}$ task, and $$T_{n,k}^{exe} = \frac{\omega_k}{f_n^{mec}};$$

$f_n^{mec}$ represents computing power for the $n^{th}$ user to allocate a resource of the server to a task being executed; $T_{n,k}^{result}$ represents a delay of feeding back the processing result of the $k^{th}$ task to the $n^{th}$ user, and $$T_{n,k}^{result} = \frac{O_k}{R_{mec,n}};$$

$R_{mec, n}$ represents a downlink data rate at which the $n^{th}$ user connects to the server through the wireless link, and $$R_{mec,n} = B\log_2\left(1 + \frac{P_{mec}H_n}{\sigma^2}\right);$$

$T_{n,k}^{coche}$ represents a delay required for the $n^{th}$ user to request a cached $k^{th}$ task, and $$T_{n,k}^{coche} = \frac{O_k}{R_{read}} = \frac{O_k}{R_{mec,n}};$$

$R_{read}$ represents a reading rate of a cache of the server; $E_{n,k}$ represents total energy for executing the $k^{th}$ task by the $n^{th}$ user; $E_{n,k}^{local}$ represents a local computing energy consumption of executing the $k^{th}$ task by the $n^{th}$ user, and $E_{n,k}^{local}=\xi\omega_k(f_{n,k}^{local})^2$; $\xi$ represents an energy coefficient; $E_{n,k}^{off}$ represents an energy consumption in a process of sending the $k^{th}$ task to the server by the $n^{th}$ user, and $E_{n,k}^{off}=P_nT_{n,k}^{trans}$; $E_{n,k}^{coche}$ represents an energy consumption required by the $n^{th}$ user to cache the $k^{th}$ task, and $E_{n,k}^{coche}=P_{mec}T_{n,k}^{result}$; and $P_{mec}$ represents transmission power of the server.

Optionally, in the S2, the joint optimization model configured for the task unloading and caching and having the constraint is:

$$\min_x \sum_{n=1}^{N}\sum_{k=1}^{K}\left(\lambda_n^T T_{n,k} + \lambda_n^E E_{n,k}\right)$$

where $\lambda_n^T$ represents a weight factor of a delay in an execution process of an $n^{th}$ user, $T_{n,k}$ represents a total unloading delay of executing a $k^{th}$ task by the $n^{th}$ user, $\lambda_n^E$ represents a weight factor of an energy consumption in the execution process of the user, $E_{n,k}$ represents the mobile device-side total energy consumption, x represents a joint decision of the task unloading and caching, n represents the $n^{th}$ user, N represents a total quantity of users, and K represents presence of K tasks.
Optionally, the constraint includes:

$$E_{n,k} \leq \theta_n T_{n,k} \leq \max (t_{k,a}^{com} - t_{k,a}^{res})$$

$$\sum_{n=1}^{N} x_k f_n^{mec} \leq S, f_n^{mec} \geq 0$$

$$\sum_{k=1}^{K} \frac{x_k(x_k - 1)O_k}{2} \leq M$$

$$\lambda_n^E + \lambda_n^T = 1, \lambda_n^E, \lambda_n^T \in (0,1) \ x_k \in \{0,1,2\}$$

where $E_{n,k}$ represents total energy of executing the $k^{th}$ task by the $n^{th}$ user, $\theta_n$ represents an energy consumption threshold, $T_{n,k}$ represents a total delay of executing the $k^{th}$ task by the $n^{th}$ user, $\lambda_n^T$ represents the weight factor of the delay in the execution process of the $n^{th}$ user, $\lambda_n^E$ represents the weight factor of the energy consumption in the execution process of the $n^{th}$ user, $t_{k,a}^{com}$ represents completion time of an $\alpha^{th}$ request for a task $d_k$, $t_{k,a}^{res}$ represents request time of the $\alpha^{th}$ request for the task $d_k$, $x_k$ represents a joint decision variable for unloading and caching the task $d_k$, $x_k=0$ represents that the task $d_k$ is processed locally by the user, $x_k=1$ represents that the task $d_k$ is unloaded to a server for processing, $x_k=2$ represents that the task $d_k$ has been cached, $f_n^{mec}$ represents a computing resource of the $n^{th}$ user for computing an unloading task, S represents maximum computing power of the server, $O_k$ represents a size of a processing result of the task $d_k$, M represents a size of a cache capacity of the server, and $d_k$ represents the $k^{th}$ task.

Optionally, in the S3, the fitness function is:

$$\text{fitness} = \min\left(\sum_{n=1}^{N}\sum_{k=1}^{K}(\lambda_n^T T_{n,k} + \lambda_n^E E_{n,k}) + \sum_{n=1}^{N}\sum_{k=1}^{K}(\max(0, (E_{n,k} - \theta_n))) \times 1000 + \sum_{n=1}^{N}\sum_{k=1}^{K}\sum_{a=1}^{A}\max(0, (T_{n,k} - \max(t_{k,a}^{com} - t_{k,a}^{res}))) \times 1000\right)$$

where fitness represents a fitness value, $\lambda_n^T$ represents a weight factor of a delay in an execution process of an $n^{th}$ user, $\lambda_n^E$ represents a weight factor of an energy consumption in the execution process of the $n^{th}$ user, $E_{n,k}$ represents total energy of executing a $k^{th}$ task by the $n^{th}$ user, $\theta_n$ represents an energy consumption threshold, $T_{n,k}$ represents a total delay of executing the $k^{th}$ task by the $n^{th}$ user, $t_{k,a}^{com}$ represents completion time of an $\alpha^{th}$ request for a task $d_k$, $t_{k,a}^{res}$ represents request time of the $\alpha^{th}$ request for the task $d_k$, $d_k$ represents the $k^{th}$ task, N represents a total quantity of users, K represents presence of K tasks, and A represents a total quantity of requests.

The present disclosure has following beneficial effects:

(1) The present disclosure effectively reduces a cost as a quantity of users increases.

(2) The present disclosure is efficient in reducing a delay, especially when dealing with a task with a large data size.

(3) As request time slots increase, the proposed solution can more effectively utilize a cache resource, thereby reducing a system overhead cost.

(4) The cache updating strategy proposed in the present disclosure can more effectively utilize the cache space.

BRIEF DESCRIPTION OF THE DRAWINGS

FIGURE is a flowchart of an MEC task unloading method with a cache mechanism according to the present disclosure.

DETAILED DESCRIPTION OF THE EMBODIMENTS

The principles and features of the present disclosure are described below with reference to the accompanying drawings. The listed embodiments are only used to explain the present disclosure, rather than to limit the scope of the present disclosure.

The present disclosure provides an MEC task unloading method with a cache mechanism. Referring to FIGURE, the MEC task unloading method with a cache mechanism includes following steps:

S1: A task unloading total delay model with a cache mechanism and a mobile device-side total energy consumption model are established based on a user task request.

To reduce a delay and an energy consumption during task unloading, and improve data access efficiency, a task can be cached on a server. Caching allows a user to directly obtain a processing result from cache space without a need for unloading and recomputing, thus saving time and resources. However, due to limited cache space, not all tasks can be cached. For this reason, the cache mechanism in the present disclosure includes:

Popularity, freshness, and a size factor of a task are determined based on the user task request.

A function value of the task is obtained based on the popularity, the freshness, and the size factor of the task, where the function value of the task is:

$$pri_k = \alpha \times pop_k + \beta \times fre_k + \gamma \times weight_k,$$

where $\alpha$, $\beta$, and $\gamma$ represent different weight parameters, $pop_k$ represent popularity of task $d_k$, $fre_k$ represents freshness of the task $d_k$, $weight_k$ represents a size factor of the task $d_k$, and $d_k$ represents a $k^{th}$ task.

The popularity is a degree to which some tasks are widely used or requested. Research on network traffic shows that a popular task is accessed by more users, while an unpopular task is accessed less frequently. The popularity in the present disclosure is affected by three main factors: a request probability, access time, and an average request time interval.

A request probability of a task is computed as a ratio of a quantity of requests for the task to a total quantity of requests for all tasks within a specific time period. This value represents importance of the task in a current user request, and a higher request probability means that the task is more popular. Therefore, request probability $r_k$ of the task $d_k$ is expressed as:

$$r_k = \frac{Num_k}{\sum_{k=1}^{K} Num_k}$$

As described above, $\text{Num}_k$ represents a quantity of requests for the task $d_k$.

Task access time is duration required by the server to process a task request, which can be computed by dividing total task access time by a quantity of task access requests. Total time of accessing a task once is computed based on a sum of a time difference between completion time and request time of each request for the task. Shorter task access time leads to faster task retrieval, thereby increasing a possibility of a future request. Therefore, access time $t_k$ of the task $d_k$ can be expressed as:

$$t_k = \frac{\sum_{a=1}^{Num_k} (t_{k,a}^{com} - t_{k,a}^{res})}{Num_k}$$

As described above, $t_{k,a}^{com}$ represents completion time of an $\alpha^{th}$ request for the task $d_k$, in other words, time when a processing result is returned to the user, and $t_{k,a}^{res}$ represents request time of the $\alpha^{th}$ request for the task $d_k$. When the popularity of the task is evaluated, it is important to consider the task access time as it directly affects user experience.

An average request time interval of a task represents an average time interval between consecutive requests of the user for the task. A short average request time interval means that a task is frequently requested, which also increases importance of the task in a cache. Average request time interval $s_k$ of the task $d_k$ can be expressed as:

$$s_k = \frac{t_k^{last} - t_k^{first}}{Num_k}$$

$t_k^{last}$ represents time of a last request for the task $d_k$. $t_k^{first}$ represents time of a first request for the task $d_k$.

Therefore, by considering factors such as the request probability, the access time, and the average request time interval of the task, the popularity $pop_k$ of the task can be defined as:

$$pop_k = \frac{r_k}{t_k \cdot s_k} = \frac{Num_k^3}{\sum_{a=1}^{Num_k} (t_{k,a}^{com} - t_{k,a}^{res}) \cdot (t_k^{last} - t_k^{first}) \cdot \sum_{k=1}^{K} Num_k}$$

The freshness is a latest level of a cached task. The freshness of the task is considered, which helps to ensure that a cached task result is relatively latest. In the present disclosure, both the popularity and the freshness of the task are considered to ensure that the cached task is popular and relatively fresh. $t_k^{now}$ represents current time, and $t_k^{gen}$ represents generation time of the task. Therefore, the freshness is represented by $fre_k$:

$$fre_k = \frac{1}{(t_k^{now} - t_k^{gen})}(t_k^{now} > t_k^{gen})$$

Time elapsed since the task is generated is computed as a difference between the current time and the generation time of the task. A smaller difference between the current time and the generation time of the task means that the task is fresher. An inverse function ensures that the freshness is always between 0 and 1.

The cached task is not only affected by the popularity and the freshness, but also affected by a size of data associated with the task. By introducing the size factor, a system can more effectively cache the task based on a storage resource requirement. For example, if a task has a high popularity value but requires a significant quantity of processing resources due to its data size, the task has a smaller size factor than a task with a similar popularity value but a smaller data size. The size factor $weight_k$ is expressed as follows:

$$weight_k = 1 - \frac{\log_{10}(I_k)}{\log_{10}(size_{max})}$$

A value between 0 and 1 is obtained. $I_k$ represents an input data size of the task $d_k$, and $size_{max}$ represents a maximum task data size in a request set.

$r_k$ represents the request probability of the task $d_k$, $t_k$ represents the access time of the task $d_k$, $s_k$ represents the average request time interval of the task $d_k$, $Num_k$ represents the quantity of requests for the task $d_k$, $t_{k,a}^{com}$ represents the completion time of the $\alpha^{th}$ request for the task $d_k$, $t_{k,a}^{res}$ represents the request time of the $\alpha^{th}$ request for the task $d_k$, $t_k^{last}$ represents the time of the last request for the task $d_k$, $t_k^{first}$ represents the time of the first request for the task $d_k$, K represents presence of K tasks, $d_k$ represents the $k^{th}$ task, $\alpha$ represents the $\alpha^{th}$ request, $t_k^{now}$ represents the current time, $t_k^{gen}$ represents the generation time of the task $d_k$, $I_k$ represents the input data size of the task $d_k$, $size_{max}$ represents the maximum task data size in the user task request set, and $\log_{10}$ ( ) represents a computation function of the size factor.

The cache space is updated based on the function value of the task.

Optionally, that the cache space is updated based on the function value of the task includes:

A1: A request cycle is divided into a plurality of time slots.

A2: A size of a processing result of a current task in a request set of a user task request in each time slot and a current available size of the cache space of the server are obtained.

A3: Whether the current available size of the cache space of the server is greater than the size of the processing result of the current task is determined; and if so, A6 is performed; otherwise, A4 is performed.

A4: Whether the current task has been cached is determined; and if so, a function value of the current task is updated, and A5 is performed; otherwise, the processing result of the current task is added to the cache space, and A5 is performed.

A5: Function values of all tasks in the cache space are compared, a minimum value is marked as $pri_{min}$, a next task is used as a current task, and the A2 is performed.

A6: A function value of the current task is computed, function values of historical tasks in the cache space are compared, and a minimum value is marked as $pri_{min}$.

A7: If the function value of the current task is greater than the minimum value $pri_{min}$, a task corresponding to the minimum value is removed from the cache space, the current available size of the cache space is updated, and returning is performed; otherwise, the cache space is not updated, a next task is used as a current task, and the A2 is performed.

S2: Based on the task unloading total delay model and the mobile device-side total energy consumption model, with a goal of minimizing a task unloading total delay and a mobile device-side total energy consumption, a joint optimization model configured for task unloading and caching and having a constraint is established.

The task unloading total delay model is:

$$T_{n,k} = \frac{|x_k - 2||x_k - 1|}{2} T_{n,k}^{local} + x_k|x_k - 2|(1 - \text{Hit}_k) \cdot T_{n,k}^{off} + x_k \frac{|x_k - 1|}{2} \text{Hit}_k \cdot T_{n,k}^{coche}$$

The mobile device-side total energy consumption model is:

$$E_{n,k} = \frac{|x_k - 2||x_k - 1|}{2} E_{n,k}^{local} + x_k|x_k - 2|E_{n,k}^{off} + x_k \frac{|x_k - 1|}{2} E_{n,k}^{coche}$$

As described above, $T_{n,k}$ represents a total delay of executing the $k^{th}$ task by an $n^{th}$ user; $T_{n,k}^{local}$ represents a local computing delay of executing the $k^{th}$ task by the $n^{th}$ user, and $$T_{n,k}^{local} = \frac{\omega_k}{f_{n,k}^{local}} = \frac{I_k \cdot f_k}{f_{n,k}^{local}};$$

$f_{n,k}^{local}$ represents computing power of a CPU of a mobile device when the $n^{th}$ user executes the $k^{th}$ task, in other words, a quantity of CPU cycles executed per second; $\omega_k$ represents a quantity of computing resources required to complete the $k^{th}$ task, in other words, a total quantity of CPU cycles; $I_k$ represents the data size of the $k^{th}$ task, $f_k$ represents a quantity of cycles required for each data bit in the $k^{th}$ task, and $x_k$ represents a joint decision variable for unloading and caching the $k^{th}$ task; $\text{Hit}_k$ represents a cache hit rate of the $k^{th}$ task, and the cache hit rate is $$\text{Hit}_k = \frac{r_k \frac{O_k}{M}}{r_k \frac{O_k}{M} + (1 - r_k) \cdot \left(1 - \frac{O_k}{M}\right)};$$

represents the request probability of the $k^{th}$ task; $O_k$ represents a size of a processing result of the $k^{th}$ task; M represents a size of a cache capacity of the server; $T_{n,k}^{off}$ represents a persistence delay of unloading the $k^{th}$ task to the server by the $n^{th}$ user, and $T_{n,k}^{off} = T_{n,k}^{trans} + T_{n,k}^{exe} + T_{n,k}^{result}$;

$$T_{n,k}^{trans} = \frac{I_k}{R_{n,mec}}$$

represents an uplink transmission delay of unloading the $k^{th}$ task with an input size of $I_k$ to the server by the $n^{th}$ user; $R_{n,\,mec}$ represents an uplink data rate at which the $n^{th}$ user connects to the server through a wireless link, and $$R_{n,mec} = B\log_2\left(1 + \frac{P_n H_n}{\sigma^2}\right);$$

B represents a channel bandwidth; $P_n$ represents transmission power of the mobile device of the $n^{th}$ user; $H_n$ represents a gain of a channel between the $n^{th}$ user and the server; $\sigma^2$ represents additive Gaussian white noise power; $T_{n,k}^{exe}$ represents a processing delay of the server when the $n^{th}$ user executes the $k^{th}$ task, and $$T_{n,k}^{exe} = \frac{\omega_k}{f_n^{mec}};$$

$f_n^{mec}$ represents computing power for the $n^{th}$ user to allocate a resource of the server to a task being executed; $T_{n,k}^{result}$ represents a delay of feeding back the processing result of the $k^{th}$ task to the $n^{th}$ user, and $$T_{n,k}^{result} = \frac{O_k}{R_{mec,n}};$$

$R_{mec,\,n}$ represents a downlink data rate at which the $n^{th}$ user connects to the server through the wireless link, and $$R_{mec,n} = B\log_2\left(1 + \frac{P_{mec} H_n}{\sigma^2}\right);$$

$T_{n,k}^{coche}$ represents a delay required for the $n^{th}$ user to request a cached $k^{th}$ task and $$T_{n,k}^{coche} = \frac{O_k}{R_{read}} = \frac{O_k}{R_{mec,n}};$$

$R_{read}$ represents a reading rate of the cache of the server; $E_{n,k}$ represents total energy for executing the $k^{th}$ task by the $n^{th}$ user; $E_{n,k}^{local}$ represents a local computing energy consumption of executing the $k^{th}$ task by the $n^{th}$ user, and $E_{n,k}^{local} = \xi \omega_k (f_{n,k}^{local})^2$; $\xi$ represents an energy coefficient; $E_{n,k}^{off}$ represents an energy consumption in a process of sending the $k^{th}$ task to the server by the $n^{th}$ user, and $E_{n,k}^{off} = P_n T_{n,k}^{trans}$; $E_{n,k}^{coche}$ represents an energy consumption required by the $n^{th}$ user to cache the $k^{th}$ task, and $E_{n,k}^{coche} = P_{mec} T_{n,k}^{result}$; and $P_{mec}$ represents transmission power of the server.

Optionally, the joint optimization model configured for the task unloading and caching and having the constraint is:

$$\min_{x} \sum_{n=1}^{N} \sum_{k=1}^{K} \left(\lambda_n^T T_{n,k} + \lambda_n^E E_{n,k}\right)$$

As described above, $\lambda_n^T$ represents a weight factor of a delay in an execution process of the $n^{th}$ user, $T_{n,k}$ represents a total unloading delay of executing the $k^{th}$ task by the $n^{th}$ user, $\lambda_n^E$ represents a weight factor of an energy consumption in the execution process of the user, $E_{n,k}$ represents the mobile device-side total energy consumption, x represents a joint decision of the task unloading and caching, n represents the $n^{th}$ user, N represents a total quantity of users, and K represents the presence of the K tasks. If a particle violates a first energy consumption constraint, a penalty of 1000 times a violation quantity is added to the fitness function. If a second delay constraint is violated, a penalty of 1000 times a violation quantity is added to the fitness function.

Optionally, the constraint includes:

$E_{n,k} \leq \theta_n$, which indicates that the energy consumption threshold is given in the constraint;

$T_{n,k} \leq \max(t_{k,a}^{com} - t_{k,a}^{res})$, which indicates that an execution delay of the task does not exceed maximum completion time to ensure that each task is completed within specified time;

$$\sum_{n=1}^{N} x_k f_n^{mec} \leq S, \; f_n^{mec} \geq 0,$$

which ensures that a computing resource used for computing an unloading task is positive and that a total quantity of computing resources allocated to all users does not exceed maximum computing power of the server;

$$\sum_{k=1}^{K} \frac{x_k(x_k-1)O_k}{2} \leq M,$$

which indicates that the cached task result cannot exceed the cache capacity of the server;

$\lambda_n^E + \lambda_n^T = 1 \lambda_n^E$, $\lambda_n^T \in (0,1)$, which indicates that different users can select different weight parameters, and the two values represent preferences for the energy consumption and the delay in an optimization problem; and $x_k \in \{0,1,2\}$, which indicates the joint decision variable for unloading and caching the task.

As described above, $E_{n,k}$ represents the total energy consumption of executing the $k^{th}$ task by the $n^{th}$ user, $\theta_n$ represents the energy consumption threshold, $T_{n,k}$ represents the total delay of executing the $k^{th}$ task by the $n^{th}$ user, $\lambda_n^T$ represents the weight factor of the delay in the execution process of the $n^{th}$ user, $\lambda_n^E$ represents the weight factor of the energy consumption in the execution process of the $n^{th}$ user, $t_{k,a}^{com}$ represents the completion time of the $\alpha^{th}$ request for the task $d_k$, $t_{k,a}^{res}$ represents the request time of the $\alpha^{th}$ request for the task $d_k$, $x_k$ represents the joint decision variable for unloading and caching the task $d_k$, $x_k=0$ represents that the task $d_k$ is processed locally by the user, $x_k=1$ represents that the task $d_k$ is unloaded to the server for processing, and $x_k=2$ represents that the task $d_k$ has been cached. A higher cache hit rate leads to a higher frequency of task retrieval from the cache, thereby reducing communication and computation delays. On the contrary, a low cache hit rate will increase a frequency of unloading the task to the MEC server, resulting in a higher delay. $f_n^{mec}$ represents a computing resource of the $n^{th}$ user for computing the unloading task, S represents the maximum computing power of the server, $O_k$ represents the size of the processing result of the task $d_k$, M represents the size of the cache capacity of the server, and $d_k$ represents the $k^{th}$ task.

S3: The joint optimization model is transformed into the fitness function for the particle, where the user task request is the particle.

Optionally, the fitness function is:

$$\text{fitness} = \min\left(\sum_{n=1}^{N}\sum_{k=1}^{K}(\lambda_n^T T_{n,k} + \lambda_n^E E_{n,k}) + \sum_{n=1}^{N}\sum_{k=1}^{K}(\max(0,(E_{n,k}-\theta_n))) \times 1000 + \right.$$

-continued $$\left. \sum_{n=1}^{N}\sum_{k=1}^{K}\sum_{a=1}^{A}\max\left(0, (T_{n,k} - \max(t_{k,a}^{com} - t_{k,a}^{TRS}))\right) \times 1000\right)$$

As described above, fitness represents a fitness value, $\lambda_n^T$ represents the weight factor of the delay in the execution process of the $n^{th}$ user, $\lambda_n^E$ represents the weight factor of the energy consumption in the execution process of the $n^{th}$ user, $\theta_n$ represents the total energy of executing the $k^{th}$ task by the $n^{th}$ user, $\theta_n$ represents the energy consumption threshold, $T_{n,k}$ represents the total delay of executing the $k^{th}$ task by the $n^{th}$ user, $t_{k,a}^{com}$ represents the completion time of the $\alpha^{th}$ request for the task $d_k$, $t_{k,a}^{res}$ represents the request time of the $\alpha^{th}$ request for the task $d_k$, $d_k$ represents the $k^{th}$ task, N represents the total quantity of users, K represents the presence of the K tasks, and A represents a total quantity of requests.

S4: An optimal solution of the particle is determined by using a particle swarm algorithm based on the fitness function, where the optimal solution of the particle is an optimal task unloading decision of the user task request.

Specifically, following steps are included:

Step 1: In each time slot slot=1,2, . . . , T, the user randomly requests a task, where a decision of each request represents a solution of the particle. $\text{pri}_k$ of the particle is computed, and the cache space is updated. A total quantity of particles is N.

Step 2: The particle is initialized. Each particle has two attributes: a velocity and a position. The velocity represents a moving direction and distance of the particle in a next iteration, and the position represents the solution of the particle. In addition, optimal position $p\_best_i$, fitness value $best\_fitness_i$, global optimal position $g\_best$, and total cost $min\_cost$ of the particle are initialized.

Step 3: The optimal solution is obtained through iteration. In each iteration, the particle updates $v_i$ and $l_i$ based on the $p\_best_i$ and the $g\_best$. The optimal $p\_best_i$ of each particle is added to decision array x, and the $min\_cost$ is updated. An equation of updating the position of each particle i in iteration j is:

$$l_i^j = l_i^{j-1} + v_i^j$$

As described above, $l_i^j$ represents a current position of the particle i in the iteration j, $v_i^j$ represents an updating velocity of the particle i in the iteration j, and $l_i^{j-1}$ represents a position of the particle i in iteration j−1.

An equation of updating the velocity of each particle is:

$$v_i^j = w \cdot v_i^{j-1} + c_1 \cdot v_1 \cdot (p\_best_i^{j-1} - l_i^{j-1}) + c_2 \cdot r_2 \cdot (g\_best^{j-1} - l_i^{j-1})$$

As described above, w represents an inertia weight, with a value range of [0.4, 2], and $c_1$ and $c_2$ respectively represent an individual learning factor and a group learning factor, where when the two values are large, a search velocity is high, and as a result, the optimal solution may be missed. When the two values are small, the search velocity is low, and as a result, a local optimal value may be generated. Therefore, it is set that $c_1=2$ and $c_2=2$. $r_1$ and $r_2$ are random numbers in (0,1) to increase search randomness.

Step 4: An optimal decision solution and total cost are returned.

The present disclosure has following technical effects:

(1) In order to reduce a delay and an energy consumption of repetitive task unloading and processing, a cache mechanism is introduced. This mechanism considers a task request probability, task access time, average task request time, freshness, and a data size to determine a to-be-cached task. By considering these factors, the cache mechanism can effectively optimize selection of a to-be-cached task.

(2) In order to further improve performance and accuracy of the cache mechanism, a cache updating strategy is proposed based on the aforementioned cache mechanism. Effectiveness of this strategy is evaluated by monitoring cache utilization and a cache hit rate over a period of time.

(3) The present disclosure mainly studies a joint optimization model for task unloading and caching in a multi-user single-MEC server environment, with a goal of minimizing a total delay and a total energy consumption of a task. An optimization problem of this model is a mixed integer nonlinear programming problem (MINLP). To resolve this optimization problem, the total delay and the total energy consumption are defined as objective functions, and a penalty function is used to handle a constraint. The optimization problem is transformed into a fitness function, and a particle swarm optimization algorithm is used to obtain an optimal joint decision.

The above are merely preferred embodiments of the present disclosure, and are not intended to limit the present disclosure. Any modifications, equivalent replacements, improvements, and the like made within the spirit and principle of the present disclosure shall be all included in the protection scope of the present disclosure.

The invention claimed is:

1. A mobile edge computing (MEC) task unloading method with a cache mechanism, comprising:

S1: establishing a task unloading total delay model with the cache mechanism and a mobile device-side total energy consumption model based on a user task request;

S2: based on the task unloading total delay model and the mobile device-side total energy consumption model, with a goal of minimizing a task unloading total delay and a mobile device-side total energy consumption, establishing a joint optimization model configured for task unloading and caching and having a constraint;

S3: transforming the joint optimization model into a fitness function for a particle, wherein the user task request is the particle; and S4: determining an optimal solution of the particle by using a particle swarm algorithm based on the fitness function, wherein the optimal solution of the particle is an optimal task unloading decision of the user task request;

wherein in the S1, the cache mechanism comprises:

determining popularity, freshness, and a size factor of a task based on the user task request;

obtaining a function value of the task based on the popularity, the freshness, and the size factor of the task; and updating a cache space based on the function value of the task;

wherein the popularity $pop_k$ is:

$$pop_k = \frac{r_k}{t_k \cdot s_k} = \frac{Num_k^2}{Num_k \sum_{a=1}^{} (t_{k,a}^{com} - t_{k,a}^{res}) \cdot (t_k^{last} - t_k^{first}) \cdot \sum_{k=1}^{K} Num_k}$$

the freshness $fre_k$ is:

$$fre_k = \frac{1}{(t_k^{now} - t_k^{gen})} (t_k^{now} > t_k^{gen})$$

the size factor $weight_k$ is:

$$weight_k = 1 - \frac{\log_{10}(I_k)}{\log_{10}(size_{max})}$$

wherein $r_k$ represents a request probability of a task $d_k$, $t_k$ represents access time of the task $d_k$, $s_k$ represents an average request time interval of the task $d_k$, $Num_k$ represents a quantity of requests for the task $d_k$, $t_{k,a}^{com}$ represents completion time of an $\alpha^{th}$ request for the task $d_k$, $t_{k,a}^{res}$ represents request time of the $\alpha^{th}$ request for the task $d_k$, $t_k^{last}$ represents time of a last request for the task $d_k$, $t_k^{first}$ represents time of a first request for the task $d_k$, K represents presence of K tasks, $d_k$ represents a $k^{th}$ task, $\alpha$ represents the $\alpha^{th}$ request, $t_k^{now}$ represents current time, $t_k^{gen}$ represents generation time of the task $d_k$, $I_k$ represents an input data size of the task $d_k$, $size_{max}$ represents a maximum task data size in a user task request set, and $\log_{10}(\ )$ represents a computation function of the size factor;

wherein the task unloading total delay model is:

$$T_{n,k} = \frac{|x_k - 2||x_k - 1|}{2} T_{n,k}^{local} + x_k|x_k - 2|(1 - Hit_k) \cdot T_{n,k}^{off} + x_k \frac{|x_k - 1|}{2} Hit_k \cdot T_{n,k}^{cache}$$

the mobile device-side total energy consumption model is:

$$E_{n,k} = \frac{|x_k - 2||x_k - 1|}{2} E_{n,k}^{local} + x_k|x_k - 2|E_{n,k}^{off} + x_k \frac{|x_k - 1|}{2} E_{n,k}^{cache}$$

wherein $T_{n,k}$ represents a total delay of executing the $k^{th}$ task by an $n^{th}$ user; $T_{n,k}^{local}$ represents a local computing delay of executing the $k^{th}$ task by the $n^{th}$ user, and $$T_{n,k}^{local} = \frac{\omega_k}{f_{n,k}^{local}} = \frac{I_k \cdot f_k}{f_{n,k}^{local}};$$

$f_{n,k}^{local}$ represents computing power of a central processing unit (CPU) of a mobile device when the $n^{th}$ user executes the $k^{th}$ task, wherein the computing power of the CPU of the mobile device is a quantity of CPU cycles executed per second; $\omega_k$ represents a quantity of computing resources required to complete the $k^{th}$ task, wherein the quantity of the computing resources required to complete the $k^{th}$ task is a total quantity of the CPU cycles;

$I_k$ represents a data size of the $k^{th}$ task, $f_k$ represents a quantity of cycles required for each data bit in the $k^{th}$ task, and $x_k$ represents a joint decision variable for unloading and caching the $k^{th}$ task; $Hit_k$ represents a cache hit rate of the $k^{th}$ task, and the cache hit rate is $$Hit_k = \frac{r_k \frac{O_k}{M}}{r_k \frac{O_k}{M}(1-r_k) \cdot \left(1 - \frac{O_k}{M}\right)};$$

$r_k$ represents a request probability of the $k^{th}$ task; $O_k$ represents a size of a processing result of the $k^{th}$ task; M represents a size of a cache capacity of a server; $T_{n,k}^{off}$ represents a persistence delay of unloading the $k^{th}$ task to the server by the $n^{th}$ user, and $T_{n,k}^{off} = T_{n,k}^{trans} + T_{n,k}^{exe} + T_{n,k}^{result}$;

$$T_{n,k}^{trans} = \frac{I_k}{R_{n,mec}}$$

represents an uplink transmission delay of unloading the $k^{th}$ task with an input size of $I_k$ to the server by the $n^{th}$ user, $R_{n,mec}$ represents an uplink data rate at which the $n^{th}$ user connects to the server through a wireless link, and $$R_{n,mec} = B\log_2\left(1 + \frac{P_n H_n}{\sigma^2}\right);$$

B represents a channel bandwidth; $P_n$ represents transmission power of the mobile device of the $n^{th}$ user;

$H_n$ represents a gain of a channel between the $n^{th}$ user and the server; $\sigma^2$ represents additive Gaussian white noise power; $T_{n,k}^{exe}$ represents a processing delay of the server when the $n^{th}$ user executes the $k^{th}$ task, and $$T_{n,k}^{exe} = \frac{\omega_k}{f_n^{mec}};$$

$f_n^{mec}$ represents computing power for the $n^{th}$ user to allocate a resource of the server to a task being executed; $T_{n,k}^{result}$ represents a delay of feeding back the processing result of the $k^{th}$ task to the $n^{th}$ user, and $$T_{n,k}^{result} = \frac{O_k}{R_{mec,n}};$$

$R_{mec,n}$ represents a downlink data rate at which the $n^{th}$ user connects to the server through the wireless link, and $$R_{mec,n} = B\log_2\left(1 + \frac{P_{mec} H_n}{\sigma^2}\right);$$

$T_{n,k}^{coche}$ represents a delay required for the $n^{th}$ user request a cached $k^{th}$ task, and $$T_{n,k}^{cache} = \frac{O_k}{R_{read}} = \frac{O_k}{R_{mec,n}};$$

$R_{read}$ represents a reading rate of a cache of the server; $E_{n,k}$ represents total energy for executing the $k^{th}$ task by the $n^{th}$ user; $E_{n,k}^{local}$ represents a local computing energy consumption of executing the $k^{th}$ task by the $n^{th}$ user, and $E_{n,k}^{local} = \xi \omega k (f_{n,k}^{local})^2$;

$\xi$ represents an energy coefficient; $E_{n,k}^{off}$ represents an energy consumption in a process of sending the $k^{th}$ task to the server by the $n^{th}$ user, and $E_{n,k}^{off} = P_n T_{n,k}^{trans}$; $E_{n,k}^{coche}$ represents an energy consumption required by the $n^{th}$ user to cache the $k^{th}$ task, and $E_{n,k}^{coche} = P_{mec} T_{n,k}^{result}$; and $P_{mec}$ represents transmission power of the server.

2. The MEC task unloading method with the cache mechanism according to claim 1, wherein the function value of the task is:

$$pri_k = \alpha \times pop_k + \beta \times fre_k + \gamma \times weight_k$$

wherein $\alpha$, $\beta$, and $\gamma$ represent different weight parameters, $pop_k$ represent popularity of a task $d_k$, $fre_k$ represents freshness of the task $d_k$, $weight_k$ represents a size factor of the task $d_k$, and $d_k$ represents the $k^{th}$ task.

3. The MEC task unloading method with the cache mechanism according to claim 1, wherein the step of updating the cache space based on the function value of the task comprises:

A1: dividing a request cycle into a plurality of time slots;

A2: obtaining a size of a processing result of a current task in a request set of a user task request in each time slot and a current available size of the cache space of the server;

A3: determining whether the current available size of the cache space of the server is greater than the size of the processing result of the current task; and if so, performing A6; otherwise, performing A4;

A4: determining whether the current task has been cached; and if so, updating a function value of the current task, and performing A5; otherwise, adding the processing result of the current task to the cache space, and performing the A5;

A5: comparing function values of all tasks in the cache space, marking a minimum value as $pri_{min}$, using a next task as the current task, and performing the A2;

A6: computing a function value of the current task, comparing function values of historical tasks in the cache space, and marking a minimum value as the $pri_{min}$; and A7: if the function value of the current task is greater than the minimum value $pri_{min}$, removing a task corresponding to the minimum value from the cache space, updating the current available size of the cache space, and returning; otherwise, skipping updating the cache space, using the next task as the current task, and performing the A2.

4. The MEC task unloading method with the cache mechanism according to claim 1, wherein in the S2, the joint optimization model configured for the task unloading and caching and having the constraint is:

$$\min_x \sum_{n=1}^{N} \sum_{k=1}^{K} \left(\lambda_n^T T_{n,k} + \lambda_n^E E_{n,k}\right)$$

wherein $\lambda_n^T$ represents a weight factor of a delay in an execution process of the $n^{th}$ user, $T_{n,k}$ represents a total unloading delay of executing the $k^{th}$ task by the $n^{th}$ user, $\lambda_n^E$ represents a weight factor of an energy consumption in the execution process of the $n^{th}$ user, $E_{n,k}$ represents the mobile device-side total energy consumption, x represents a joint decision of the task unloading and caching, n represents the $n^{th}$ user, N represents a total quantity of users, and K represents the presence of the K tasks.

5. The MEC task unloading method with the cache mechanism according to claim 4, wherein the constraint comprises:

$$E_{n,k} \leq \theta_n T_{n,k} \leq \max(t_{k,a}^{com} - t_{k,a}^{res})$$

$$\sum_{n=1}^{N} x_k f_n^{mec} \leq S, \; f_n^{mec} \geq 0$$

$$\sum_{k=1}^{K} \frac{x_k(x_k - 1)O_k}{2} \leq M$$

$$\lambda_n^E + \lambda_n^T = 1 \lambda_n^E, \lambda_n^T \in (0,1) \; x_k \in \{0,1,2\}$$

wherein $E_{n,k}$ represents the total energy of executing the $k^{th}$ task by the $n^{th}$ user, $\theta_n$ represents an energy consumption threshold, $T_{n,k}$ represents a total delay of executing the $k^{th}$ task by the $n^{th}$ user, $\lambda_n^T$ represents the weight factor of the delay in the execution process of the $n^{th}$ user, $\lambda_n^E$ represents the weight factor of the energy consumption in the execution process of the $n^{th}$ user, $t_{k,a}^{com}$ represents the completion time of the $\alpha^{th}$ request for the task $d_k$, $t_{k,a}^{res}$ represents the request time of the $\alpha^{th}$ request for the task $d_k$, $x_k$ represents the joint decision variable for unloading and caching the task $d_k$, $x_k=0$ represents that the task $d_k$ is processed locally by the $n^{th}$ user, $x_k=1$ represents that the task $d_k$ is unloaded to the server for processing, $x_k=2$ represents that the task $d_k$ has been cached, $f_n^{mec}$ represents a computing resource of the $n^{th}$ user for computing an unloading task, S represents maximum computing power of the server, $O_k$ represents the size of the processing result of the task $d_k$, M represents the size of the cache capacity of the server, and $d_k$ represents the $k^{th}$ task.

6. The MEC task unloading method with the cache mechanism according to claim 1, wherein in the S3, the fitness function is:

fitness =

$$\min\left(\sum_{n=1}^{N}\sum_{k=1}^{K}(\lambda_n^T T_{n,k} + \lambda_n^E E_{n,k}) + \sum_{n=1}^{N}\sum_{k=1}^{K}(\max(0, (E_{n,k} - \theta_n))) \times 1000 + \sum_{n=1}^{N}\sum_{k=1}^{K}\sum_{a=1}^{A}\max(0, (T_{n,k} - \max(t_{k,a}^{com} - t_{k,a}^{res}))) \times 1000\right)$$

wherein fitness represents a fitness value, $\lambda_n^T$ represents a weight factor of a delay in an execution process of the $n^{th}$ user, $\lambda_n^E$ represents a weight factor of an energy consumption in the execution process of the $n^{th}$ user, $E_{n,k}$ represents the total energy of executing the $k^{th}$ task by the $n^{th}$ user, $\theta_n$ represents an energy consumption threshold, $T_{n,k}$ represents a total delay of executing the $k^{th}$ task by the $n^{th}$ user, $t_{k,a}^{com}$ represents the completion time of the $\alpha^{th}$ request for the task $d_k$, $t_{k,a}^{res}$ represents the request time of the $\alpha^{th}$ request for the task $d_k$, $d_k$ represents the $k^{th}$ task, N represents a total quantity of users, K represents the presence of the K tasks, and A represents a total quantity of requests.

* * * * *